US011601718B2

(12) United States Patent
Chen et al.

(10) Patent No.: US 11,601,718 B2
(45) Date of Patent: Mar. 7, 2023

(54) ACCOUNT BEHAVIOR PREDICTION USING PREDICTION NETWORK

(71) Applicant: HULU, LLC, Santa Monica, CA (US)

(72) Inventors: Qingying Chen, Beijing (CN); Shulei Ma, Beijing (CN); Chunyang Wei, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/335,400

(22) Filed: Jun. 1, 2021

(65) Prior Publication Data

US 2022/0385975 A1 Dec. 1, 2022

(51) Int. Cl.
*H04H 60/56* (2008.01)
*H04N 21/466* (2011.01)
*H04N 21/45* (2011.01)
*H04N 21/442* (2011.01)

(52) U.S. Cl.
CPC ... *H04N 21/4667* (2013.01); *H04N 21/44204* (2013.01); *H04N 21/44218* (2013.01); *H04N 21/4532* (2013.01); *H04N 21/4666* (2013.01)

(58) Field of Classification Search
CPC .. H04N 21/482; H04N 21/252; H04N 21/234; H04N 21/4667; H04N 21/8133; G06N 3/084

USPC ...................................... 725/13, 14, 46, 146
See application file for complete search history.

(56) References Cited

U.S. PATENT DOCUMENTS

2017/0302979 A1* 10/2017 Kaya .................... H04N 21/482
2020/0286112 A1* 9/2020 Zhou .................... G06N 3/0454

* cited by examiner

*Primary Examiner* — Jivka A Rabovianski
(74) *Attorney, Agent, or Firm* — Kwan & Olynick LLP

(57) ABSTRACT

In some embodiments, a method inputs a sequence of historical behaviors for a plurality of instances of content into a prediction network to generate a sequence of values that model the sequence of historical behaviors. A restriction on an operation performed by the prediction network is based on a characteristic of an viewing behavior. A sequence of attention scores is generated based on a similarity of a current behavior for a first instance of content to respective instances of historical behaviors in the sequence of historical behaviors. The method adjusts respective values based on corresponding attention scores to generate an adjusted sequence of values. The adjusted sequence of features are sampled to generate an output from the prediction network that models the sequence of historical behaviors based on the current behavior. The output for determining a prediction if the current behavior is indicative of the viewing behavior.

21 Claims, 7 Drawing Sheets

ACCOUNT BEHAVIOR PREDICTION USING PREDICTION NETWORK

BACKGROUND

A user account may view content in different ways. For example, a user account may view one video of a show only, such as one episode in a playback session. Then, the user account may view another show. However, another user account may view multiple episodes (e.g., three or more) of the same show within a given period, such as in the same playback session or within a time limit (e.g., a single day). The latter viewing of multiple episodes may be referred to as an immersive viewing behavior or immersive watch behavior. For example, the immersive viewing behavior can be defined by viewing videos that meet a condition, such as viewing related videos with view-through rates greater than a threshold (e.g., viewed X videos during a set time period).

A video delivery system may provide supplemental content to user accounts, such as during breaks of main content that is being watched. Typically, the timing of the breaks are pre-set for all user accounts and interrupt the main content regardless of the way the user accounts are watching the main content. However, some user accounts that may be watching multiple episodes of the same show may be more immersed in what they are watching and become less responsive to the supplemental content being provided. For example, the users of the user account may be less amenable to having the main content being interrupted than a more casual viewer of only one episode. Interruption of user accounts that are exhibiting the immersive viewing behavior may negatively affect the user accounts perception of the video delivery service.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
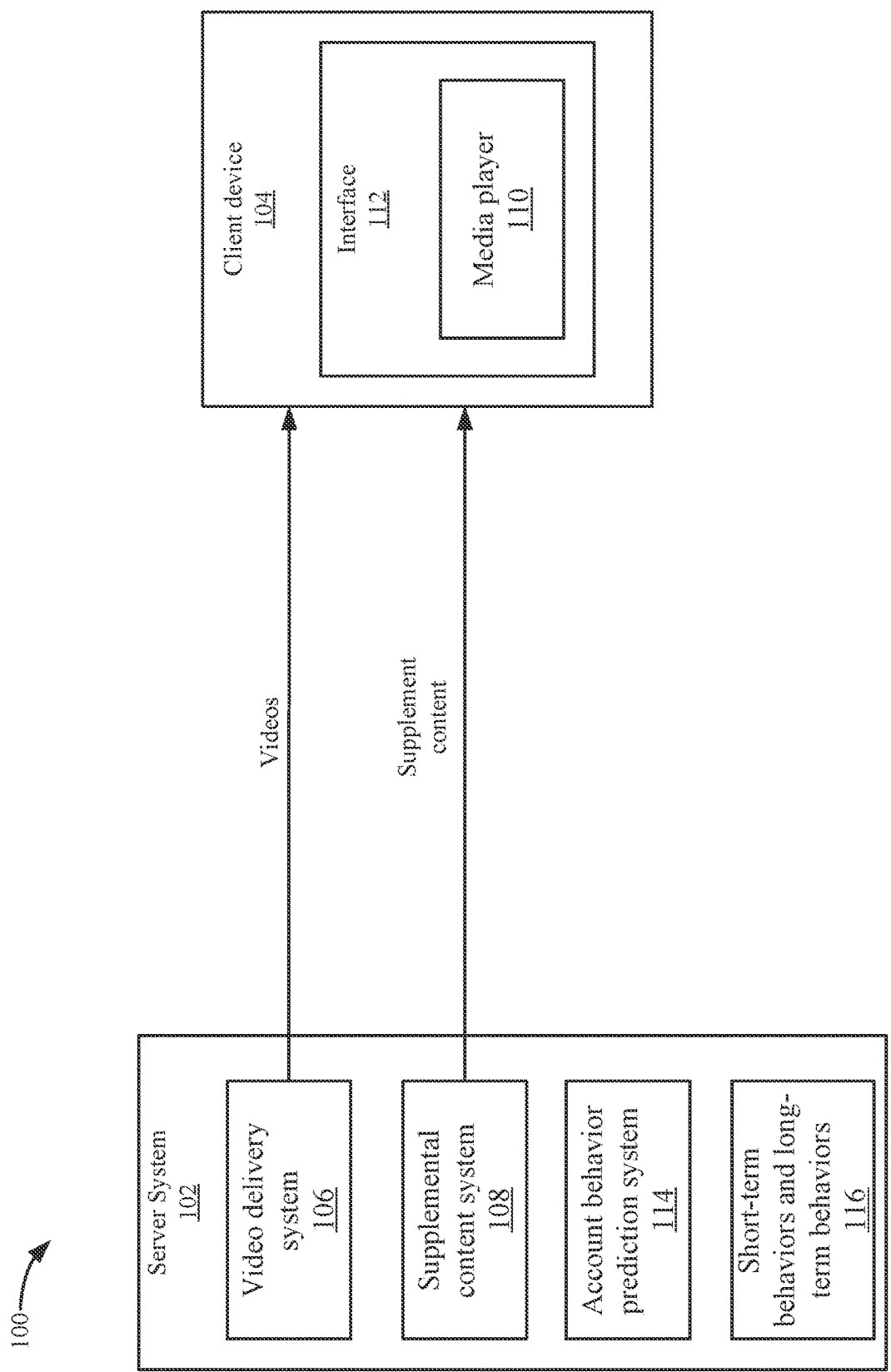
FIG. 1 depicts a simplified system for predicting a behavior of a user account according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system may provide content to a user account. Different user accounts may exhibit different viewing behavior when viewing multiple instances of content. For example, an immersive viewing behavior, referred to as binge viewing or binge watching, may be when one user account watches a number of instances of content within a threshold. The instances may be related by a characteristic (e.g., episodes of a show). Also, the instances may be viewed consecutively within a threshold, but may be viewed non-consecutively within a threshold. The threshold may be a time-based threshold, such as within a day, within a playback session, or within multiple playback sessions.

A video delivery system may want to deliver different experiences to user accounts based on their behavior. For example, the video delivery system may provide a different viewing experience when the immersive viewing behavior is detected. In some examples, the video delivery system may deliver supplemental content in a different format when the immersive viewing behavior is detected. For example, the video delivery system may delivery a sequence of instances of supplemental content to the user account during a time period, such as at the beginning of the playback of main content. Delivering the supplemental content before the viewing of the main content may limit the interruptions during the viewing of the main content. This provides advantages in that a user account who may be immersed in viewing the main content may not be interrupted as much during the viewing of the requested main content, which improves the viewing experience. The immersive viewing behavior format may be different from a standard format of delivery supplemental content, which may deliver the instances of supplemental content at a different time, such as during a break of the main content. Also, other actions may be performed when the immersive viewing behavior is predicted.

In some embodiments, the video delivery system predicts when the user account behavior is going to exhibit an immersive viewing behavior. A prediction of whether the user account is in an immersive viewing behavior may need to be predicted before the beginning of playback of the main content or at the beginning of a playback session. This detects a user account's future behavior to view multiple instances of content.

The behavior of a user account can be capricious and vary a lot. An immersive viewing behavior may be a random event and depends on many complicated factors. Accordingly, the prediction of a behavior (e.g., the intention) of a user account is very difficult. The video delivery system may use a long-term watch behavior and a short-term watch behavior to improve the prediction of the behavior of the user account. The combination of modeling of short-term behavior and modeling of long-term behavior may improve the detection of whether a user account may intend to view content in an immersive viewing behavior. Conventionally, only long-term behavior is used to model whether a user account may view content in an immersive viewing behavior. The long-term behavior may only be used because the long-term patterns may be relatively stable over a long time period and easier to predict, which makes modeling the long-term behavior more straightforward.

A prediction network may be used to predict a user account behavior. The video delivery system may improve aspects of the prediction network to predict the immersive viewing behavior. For example, the prediction network may exploit spatial locality to enforce a local connectivity pattern between nodes in the same layer and adjacent layers of the prediction network. Because the immersive viewing experience may be based on behavior that is closely related in time and sequence, such as multiple consecutive viewings of videos, the local connectivity mechanism may improve the extraction of patterns that are more related to the immersive viewing behavior. Further, the immersive viewing behavior may treat historical behavior differently because the current request may be more relevant to only portions of the historical behavior. Accordingly, the prediction network may use an attention mechanism to weight different historical behavior that are more similar to the current behavior differently, such as by using an attention-based max pooling operation that may weight different historical behavior differently. Further, the attention mechanism may use multiple granularities of attributes for content to refine the attention scores that are applied.

System Overview

FIG. 1 depicts a simplified system for predicting a behavior of a user account according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be associated with main content, which is content that is requested by a user account associated with client device 104. For example, a user account may request a movie, an episode of a show, etc. Although videos are described, it will be understood that other content may also be delivered as the main content, such as a website, page of content, etc.

Client device 104 may be a computing device, such as a smartphone, living room device, personal computer, tablet, television, set-top box, etc. Client device 104 may include an interface 112 that may display the main content, such as videos. For example, a media player 110 may play back a video that is requested from video delivery system 106. A user account may use client device 104 and may be associated with video delivery system 106 (e.g., the user account signs up for the service). Also, video delivery system 106 may store characteristics for the user account, such as an age of a user, watch history, etc.

At some point, such as during a break in the video or when a page is displayed, a supplemental content agent 108 may select instances of supplemental content to deliver to client device 104. An instance of supplemental content may be different from the main content, such as the supplemental content may not have been originally requested by client device 104 as compared to the request for the main content. An example of supplemental content may be an advertisement that is displayed before the playback of the main content starts or during a break in the main content. Supplemental content agent 108 may detect when supplemental content should be displayed. For example, during the main content, a break may occur in which one or more instances of supplemental content should be displayed. In other embodiments, supplemental content may be displayed on a site, such as a web page, simultaneously with the main content that a user account is viewing. It will be understood that supplemental content may be displayed in different scenarios. When the supplemental content is selected, server system 102 sends the supplemental content to client device 104. Client device 104 may then display the supplemental content.

An account behavior prediction system 114 may predict the behavior of a user account. A behavior may be based on the playback of content by a user account at client device 104. The behavior may also include information other than requests for playback, such as what videos the user account has browsed, reviewed, or selected, on interface 112. Behaviors may be organized into playback sessions. For example, a playback session may be a discrete unit that is defined by characteristics, such as a login time and a logout time. When behavior is used, the behavior may be a single behavior or multiple behaviors, behaviors in a playback session, etc.

As discussed above, account behavior prediction system 114 may predict whether or not the user account may intend to view content with a viewing behavior. In some embodiments, a viewing behavior may be an immersive viewing behavior, but other types of behaviors may be used. For example, different behaviors in which characteristics for the viewing behavior can be translated into prediction system 114 may be predicted. The immersive viewing behavior may be defined based on characteristics, such as which instances of content are viewed during a threshold defined by a time period. The threshold may be measured based on a time metric, such as a time limit or an amount of playback sessions. For example, the amount of playback sessions may be the last five playback sessions or a time period may be the last X hours, X days, X weeks, etc. In one example of an immersive viewing behavior, the user account may view a number of episodes of the same type of content consecutively within a time period or non-consecutively within a time period. For example, a show may be defined as including instances that are organized in an order, such as episodes that are ordered chronologically, that make up the total possible instances that can be viewed for a show. Also, a show may have a season that is organized in several episodes. A show may be referred to as a series. The prediction may determine whether the user account is likely to watch multiple episodes of the show in a future time period, such as the next one or two hours. For example, if the user account is requesting a first episode in the show, the prediction may be to predict whether or not the user may watch multiple other episodes of the season in the next one or two hours. The prediction may predict whether the episodes may be watched in chronological order, but this may not be necessary to predict an immersive viewing behavior. For example, watching any episodes in a show may be sufficient if applicable thresholds are met. The above examples may be a simplified case and many more complicated scenarios may be appreciated that may be classified as an immersive viewing behavior.

Account behavior prediction system 114 may use short-term behaviors and long-term behaviors that are stored in storage 116 to perform the prediction of immersive viewing behavior. The short-term behaviors may be based on historical behaviors from within a first threshold. For example, the short-term behaviors may be based on a number of historical behaviors from within a shorter time period compared to the long-term behaviors.

The long-term behaviors may be based on behavior that meet a second threshold. The second threshold may be a time period that is greater than the first threshold for the short-term behaviors. For example, long-term behaviors may include behaviors that are from a longer time period (e.g., the last X months or X playback sessions) compared to the time period for short-term behaviors or outside of the time period for short-term behaviors. If the short-term behaviors are within the last day, the long term behaviors are from a time period greater than a day. Also, if the last five historical playback sessions form the short-term behavior, then the sixth, seventh, etc. previous historical playback sessions may be found in the long-term behaviors. It is noted that long-term behaviors may include at least some of the behaviors found in the short-term behaviors (e.g., the previous five playback sessions and the sixth, seventh, etc. playback sessions).

In some examples, conventional prediction methods may have only used long-term behaviors to predict an immersive viewing behavior intent. However, using long-term behaviors may not accurately predict the behavior of the user account in a short period of time, such as in the immediate future. By combining both the short-term behaviors and the long-term behaviors, account behavior prediction system 114 may improve the prediction. When the user account intent prediction is improved, the operation of supplemental content system 108 is improved by selecting a viewing experience that is more aligned with the user account intent.

Prediction system 114 may use a prediction network, such as a neural network, to generate the prediction. As will be discussed in more detail below, prediction system 114 includes improvements to the prediction network. For example, the prediction network may exploit spatial locality between nodes of adjacent layers based on the characteristics of predicting the immersive viewing behavior. Also, attention-based max pooling is used to improve the max pooling operation by weighting historical behaviors that are more similar to the current behavior differently based on characteristics of the immersive viewing behavior. Using these improvements allows more salient features from a user account's short-term behaviors to be extracted and improves the performance of the prediction network in predicting the behavior of the user account as will be described in more detail below.

User Account Intent Prediction

Figure 2:
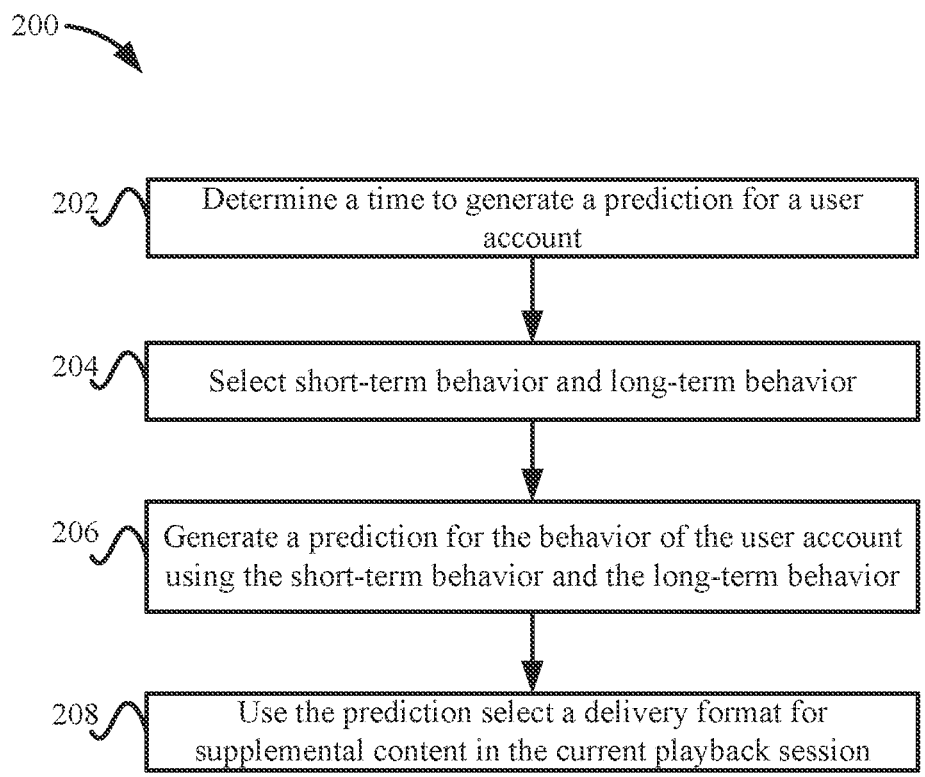
FIG. 2 depicts a simplified flowchart of a method for predicting a user account behavior according to some embodiments.

FIG. 2 depicts a simplified flowchart 200 of a method for predicting a user account behavior according to some embodiments. At 202, prediction system 114 determines a time to generate a prediction for a user account. The time to generate the prediction may be at different times. For example, the time may be before the playback of the main content starts or when the main content is requested by a user account. Also, the prediction may be generated at other times, such as after playback of the main content finishes, during playback, before a break in the main content may occur, etc.

At 204, prediction system 114 selects short-term behavior and long-term behavior. For example, the short-term behavior may be information from historical playback sessions that meet a first threshold. The long-term behavior may be information from historical playback sessions that meet a second threshold. The second threshold may be further in the past than the first threshold.

At 206, prediction system 114 generates a prediction for the behavior of the user account using the short-term behavior and the long-term behavior. The prediction may be a prediction of whether the user account may be likely to engage in an immersive viewing behavior or not engage in the immersive viewing behavior.

At 208, supplemental content system 108 uses the prediction to select a delivery format, such as from different delivery formats for the delivery of supplemental content for the current playback session. As discussed above, the format may be different depending on whether the immersive viewing behavior is predicted or not. For example, there may be a first format for delivering supplemental content for an immersive viewing behavior and a second format for delivering supplemental content for a non-immersive viewing behavior. The first format may deliver a series of instances of supplemental content at a time, such as before playback. The second format may intersperse the display of the instances of supplemental content during the playback of the video. Also, different instances of supplemental content may be selected based on the prediction of whether the behavior will be an immersive viewing behavior. For example, some instances of supplemental content may be specialized to present to user accounts that are predicted to have an immersive viewing behavior.

Prediction Network

Figure 3:
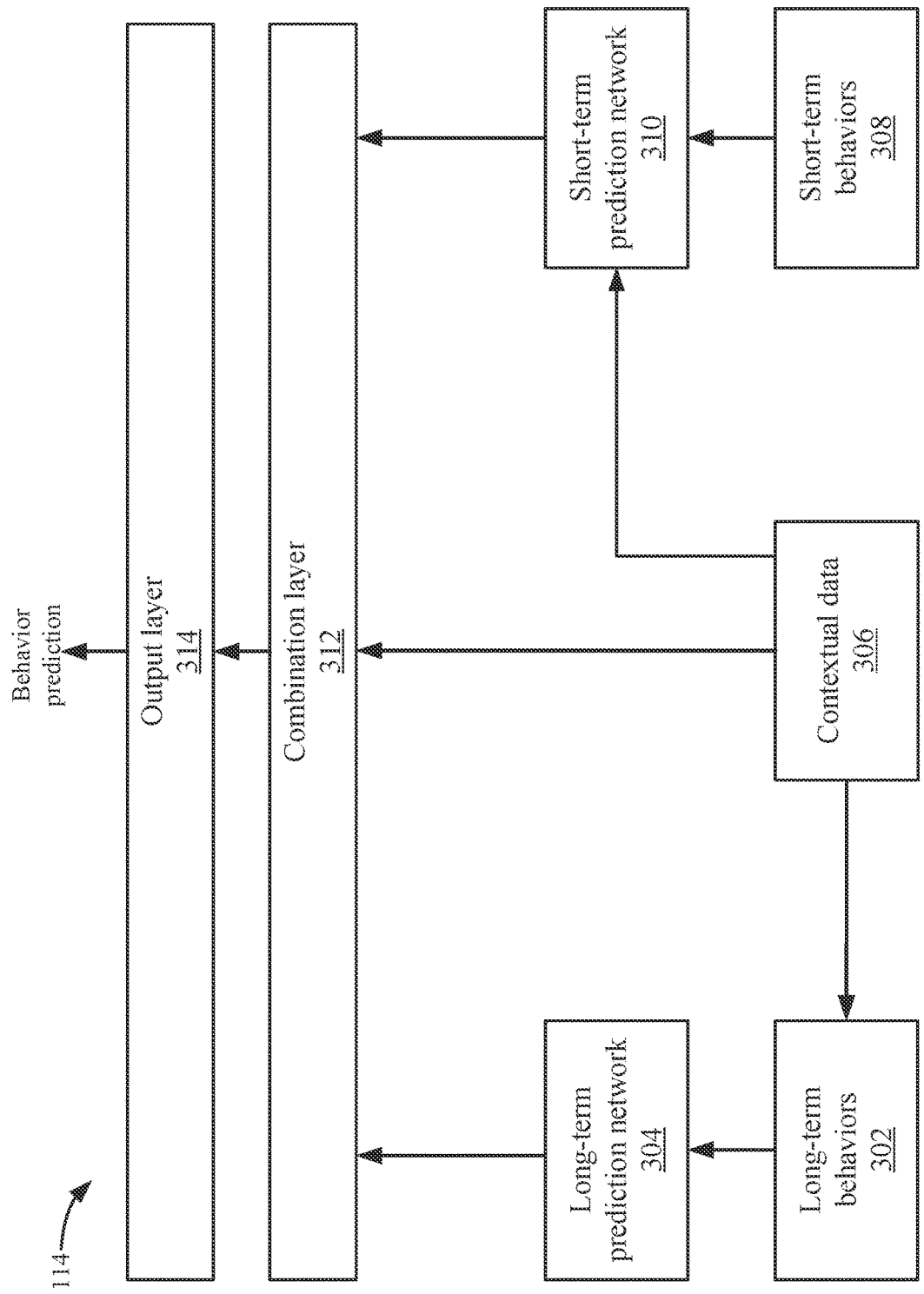
FIG. 3 depicts a more detailed example of a prediction system according to some embodiments.

FIG. 3 depicts a more detailed example of prediction system 114 according to some embodiments. As discussed above, prediction system 114 may include a prediction network, which may be a convolution neural network (CNN) but other networks may be used that can process sequential inputs, such as a recurrent neural network (RNN), may be used. The sequential input may be based on historical behavior that may be ordered based on time. Prediction system 114 includes a long-term prediction network 304 and a short-term prediction network 310.

Short-term prediction network 310 receives short-term behaviors 308 and contextual data 306, and outputs a short-term behavior modeling. Contextual data 306 may be information from a current behavior in the current playback session. For example, the contextual information may be based on an instance of content that is requested, such as a user identifier (ID), a video identifier, a series identifier, a genre, and a time, but other contextual data may be used. The user identifier may identify the user account for the request; the video identifier may identify the content that is requested for the current playback session; the series identifier may identify the series that is being requested where the video identifier is an episode in the series; the genre may be information that describes the genre of a video being requested; and the time may be the time in which the request is received. Other contextual data may also be determined for the current behavior. In some embodiments, contextual data 306 includes the attributes of the playback behavior that prediction system 114 is using to generate the prediction. That is, prediction system 114 may use a video identifier, series identifier, etc. in the modeling of the short-term behavior. The short-term behavior modeling may model the historical short-term behaviors given the current behavior. For example, the short-term behavior modeling may be a feature vector that includes feature values that represent the historical short-term behaviors.

Long-term prediction network 304 receives long-term behaviors 302 and can output a long-term behavior modeling. The long-term behavior modeling may model the historical long-term behaviors. For example, the long-term behavior modeling may be a feature vector that includes feature values that represent the historical long-term behaviors. Contextual data 306 may be incorporated into long-term behaviors 302. However, because long-term behaviors 302 may include information from a much longer time period than the short-term behaviors 308, contextual data 306 may not be included in long-term behaviors 302 in real-time. That is, due to the large amount of data in long-term behaviors, contextual data 306 for the current behavior may not affect the long-term prediction very much. However, contextual data 306 may affect the short-term prediction due to the limited time period of behavior that is used as input to short-term prediction network 310.

A combination layer 312 receives the results from long-term prediction network 304, contextual data 306, and short-term prediction network 310. Combination layer 312 may combine the results. In some embodiments, combination layer 312 may receive separate outputs from long-term prediction network 304, contextual data 306, and short-term prediction network 310, which may be three feature vectors. Combination layer 312 may then combine the feature vectors into a single vector that represents a modeling of the behavior of the user account. Combination layer 312 may combine the outputs in different ways. For example, combination layer 312 may combine all the vector values into a single vector. For example, if there are 3 vectors: [1, 2, 3], [4, 5], and [6, 7, 8], then the concatenation result is [1, 2, 3, 4, 5, 6, 7, 8]. Also, combination layer 312 may learn non-linear combinations of the long-term prediction and the short-term prediction based on contextual data 306. The output of a non-linear combination of the long-term prediction, the short-term prediction, and contextual data that may combine the values of the three outputs (e.g., three vectors) in different non-linear combinations. In some embodiments, the use of non-linear combinations may also not be necessary. The output of combination layer 312 may be a modeling of the behavior for the user account, such as a single feature vector.

An output layer 314 receives the combined result from combination layer 312 and outputs a behavior prediction. Output layer 314 may generate the prediction in different ways. For example, output layer 314 may use a prediction network to generate the behavior prediction. Also, the output of output layer 314 may be in different formats. For example, the output may predict whether the current behavior will result in an immersive viewing behavior or not. For example, output layer 314 analyzes the modeling from combination layer 312 to determine whether this behavior may be an immersive viewing behavior. In some embodiments, output layer 314 may use logistic regression to predict whether the current behavior results in an immersive viewing behavior based on the long-term prediction, the short-term prediction, and contextual data 306. Logistic regression may use a model to determine a binary response of whether the current session (e.g., the behavior modeling) predicts the user account will have an immersive viewing behavior or not. However, different models may be used to perform the prediction. Also, the outputs may be in other formats. For example, the output may rank a predicted next series of instances of supplemental content instead of providing a binary result. The ranked instances can then be used to select the supplemental content format delivery.

Short-term Prediction Network

Figure 4:
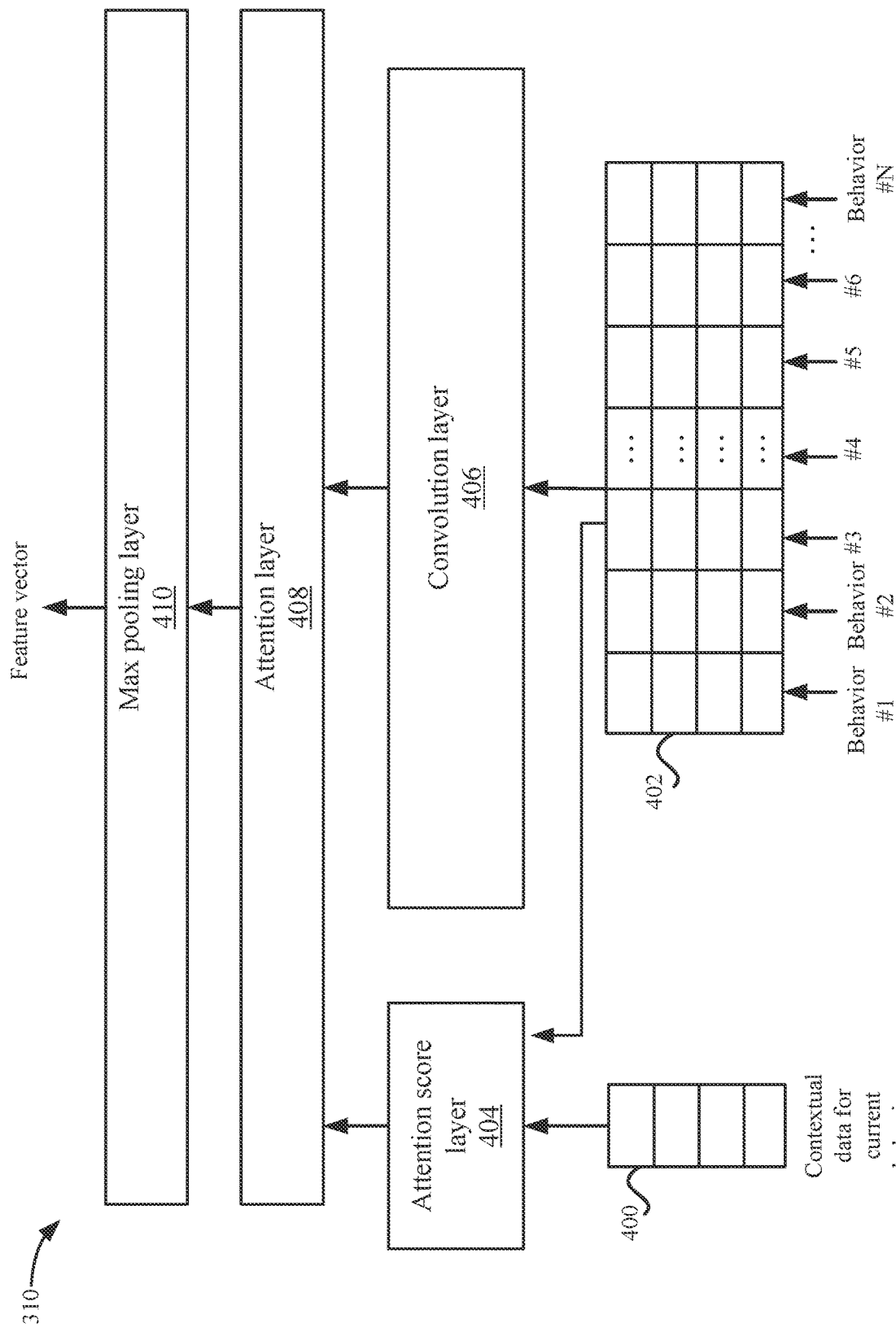
FIG. 4 depicts a more detailed example of a short-term prediction network according to some embodiments.

FIG. 4 depicts a more detailed example of short-term prediction network 310 according to some embodiments. At 400, a representation, such as an embedding, for a current behavior is shown. For example, the embedding may represent the attributes of the current behavior in a space. In some embodiments, short-term prediction network 310 may represent the attributes in a multi-dimensional Euclidean space, but other types of spaces may be used. A space may be able to represent the relationships of the embeddings to each other. The current behavior may be from a current playback session that is the basis for the prediction. The current behavior may include a single playback of content, such as the current video that is being requested for playback. However, the current behavior may include multiple requests for content or multiple playbacks of content. The current behavior may also include information other than requests for playback, such as what videos the user has browsed, reviewed, or selected on interface 112.

At 402, instances of historical behaviors are shown. The historical behavior may be a single playback of an instance of content, information from playback session, information from a number of preceding playback sessions within a given time window, etc. In this example, the historical behavior may be partitioned into instances, such as individual instances of content that are played, or instances of playback sessions that may include multiple instances of playbacks of content. The number of historical behaviors may be from a time period that is based on a threshold, such as the behaviors are from historical playbacks within the last five hours or one day.

The historical behaviors may be ordered chronologically and are represented as a behavior #1, behavior #2, . . . , behavior #N. This sequence of behaviors may be referred to as a short-term playback sequence. In some embodiments, short-term prediction network 310 may generate a representation, such as an embedding, that represents the short-term playback sequence. For example, the embedding may represent the attributes of the short-term playback sequence in the low-dimensional Euclidean space that is used for the current behavior, but other types of spaces may be used. Some attributes that can be used include the video identifier, series identifier, content duration, view-through rate, time interval between the historical playback and the current playback, content genre, etc. For attribute values that are categorical (e.g., may be within a category), short-term prediction network 310 may use embedding look-up tables to generate the embedding value. For numerical values, short-term prediction network 310 may first bucketize the values into discrete values using pre-defined boundaries and embed the values in the same method as the categorical values. For lists or arrays, such as genres, short-term prediction network 310 may first embed each element of the sequence and then reduce the values to a fixed-size embedding using a method, such as average pooling. It will be recognized that the above is only an example of how to generate an embedding, and multiple different methods may be used to generate a representation of the attributes.

After generating the embeddings for the attributes of the short-term playback sequence, short-term prediction network 310 may combine, such as concatenate, all the attribute embeddings into a unified embedding, such as an embedding vector. Accordingly, the current behavior is represented by an embedding of contextual data at 400 and the historical short-term playback sequence is represented by the embedding shown at 402. Each column of the embedding at 402 may be associated with a respective historical behavior. The embedding at 402 is input into a convolution layer 406 and an attention score layer 404. Also, attention score layer 404 receives the embedding from the current behavior.

Convolution layer 406 receives the unified embedding for the short-term playback sequence and can generate a short-term behavior modeling. For example, for each behavior, convolution layer 406 may output a feature vector that may represent the features of each short-term behavior.

Convolution layer 406 may include multiple layers that include nodes. Each node may be connected to other nodes, such as nodes in other layers. A node may process an input to generate an output, which is then sent to nodes that are connected to it. In some embodiments, an input layer of convolution layer 406 may receive the embedding from the short-term playback sequence. For example, each node may receive an embedding for a respective behavior. Then, subsequent nodes in other layers of convolution layer 406 process the outputs of other nodes based on the interconnections between the nodes.

In some embodiments, a convolution neural network of convolution layer 406 exploits spatial locality by enforcing a local connectivity pattern between nodes of adjacent layers. Spatial locality may be exploited by using a convolution that has a kernel size of a specialized value that is based on characteristics of the immersive viewing behavior. The kernel size may be a filter size that is used in a convolution operation, such as the width*height of a filter mask. For example, the immersive viewing behavior may be defined using different characteristics. For instance, an immersive viewing behavior may be based on consecutive playbacks of instances of content that have a similar characteristic, such as episodes of the same series. When a user account requests three consecutive playbacks of instances of content with the same characteristic, this may be defined as an immersive viewing behavior. Accordingly, convolution layer 406 may set the kernel size of the convolution to the value of the number of consecutive playbacks, which will be described as three (e.g., equivalent to three consecutive playbacks of instances of content) for discussion purposes. In some embodiments, a one-dimensional convolution operation with a kernel size of three is used based on the characteristics of the immersive viewing behavior. However, a different kernel sizes may be used. As is known, the convolution may analyze a number of adjacent nodes equal to the kernel size and output a value for the convolution. For example, for a kernel size with a width of three, values for the embeddings of the first three historical behaviors may be analyzed in one convolution operation. Because the immersive viewing behavior is based on three consecutive playback behaviors, the kernel size is analyzing attributes from three consecutive playback behaviors. This provides an extraction of more salient features that may be associated with the immersive viewing behavior. It is noted that the output of the convolution layer may be the same length as the short-term playback sequence. As will be discussed in more detail below, attention scores for respective short-term behaviors are applied to the output of convolution layer 406, and having the output be the same length as the short term playback sequence allows the attention scores to be applied appropriately. To ensure the output is the same length, short-term prediction network 310 may pad the embedding such that the embedding of the last (kernel size−1) positions in the short-term playback sequence can be analyzed. For example, if the kernel size is three, two columns after the last column of the unified embedding for the last historical behavior is added. The padded embeddings may be different values, such as all zero values.

Figure 5:
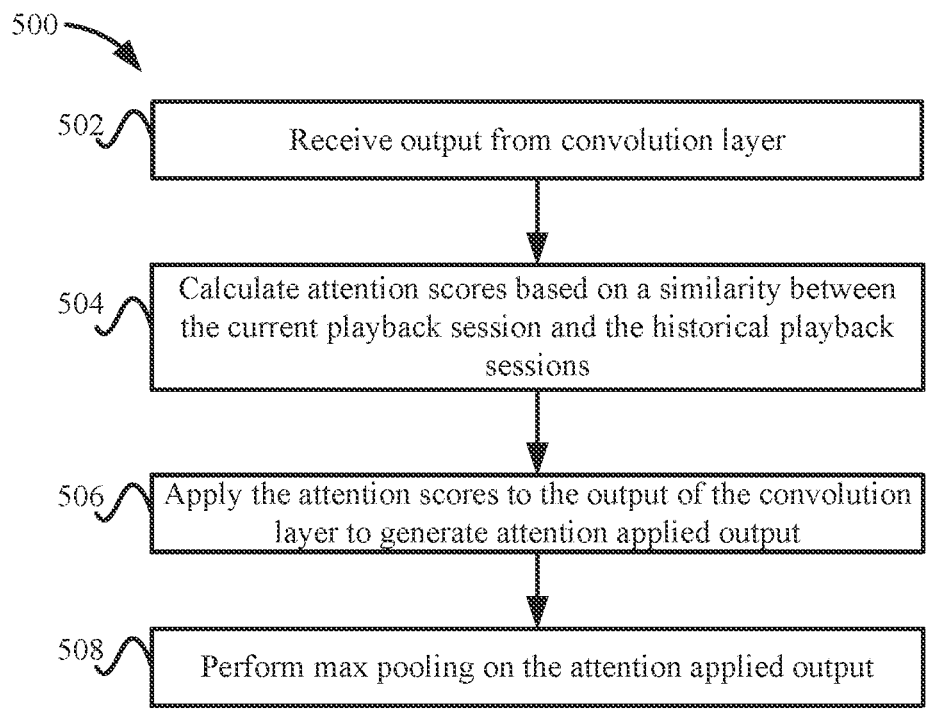
FIG. 5 depicts a simplified flowchart of a method for performing an attention-based mechanism and max pooling according to some embodiments.

After generating the output from convolution layer 406, an attention based mechanism is applied to the output and then a pooling operation is performed. FIG. 5 depicts a simplified flowchart 500 of a method for performing an attention-based mechanism and pooling operation according to some embodiments. At 502, attention layer 408 receives the output from convolution layer 406. At 504, attention-score layer 404 computes attention scores based on similarity between the current behavior and the historical behaviors. The attention scores may include a score for each of the historical behaviors that rates the similarity between a respective historical behavior and a current behavior. Attention score layer 404 may analyze the similarity between the current behavior and the historical behavior, and output an attention score for each historical behavior. When predicting an immersive viewing behavior, it may be not optimal that all behaviors receive equal attention when performing a down-sampling operation, such as a max pooling operation or average pooling operation. The down-sampling operation may reduce the values that are received as input. For example, a max pooling operation may select the maximum value from a set of inputs. Other types of pooling operations may be used, such as average pooling, which takes the average of the inputs. Traditionally, each input would receive the equal attention. However, when considering immersive viewing behavior, not all of the historical behavior may be equally relevant to the current behavior. If the max pooling operation selects a value for a historical behavior that is not the most similar to the current behavior, then the prediction may not be as accurate. For example, assume a user account has watched the following historical behaviors of a show 1, episode 1 (S1,E1), show 2, episode 1 (S2,E1), show 2, episode 2 (S2,E2), show 2, episode 3 (S2,E3), show 2, episode 4 (S2,E4), and show 3, episode 1 (S3,E1) in the historical behavior. If the current behavior is a request for show 2, episode 5, equal attention to the historical behaviors may not yield the optimal prediction. For example, when extracting features from the historical behavior, short-term prediction network 310 should pay more attention to the following attributes from the S2,E1, S2,E2, S2,E3, and S2,E4 playback behavior because the playbacks of these videos may be more similar to the current playback of S2,E5 in that the videos are from the same show. A reason that these behaviors are more similar is because they are from the same show, which is more relevant than episodes from different shows. Also, the user account watched four consecutive episodes for show 2, and not consecutive episodes for show 1 or show 3. This may be a simple example where two episodes belong to the same show, but the generation of the attention scores may be more complicated.

At 506, an attention layer 408 applies the attention scores to the output of convolution layer 406 to generate an attention-applied output. Applying the attention scores may weight the values of the output of convolution layer 406 differently based on an attention score from attention score layer 404. Attention layer 408 may generate a higher weight for the scores from historical behaviors that may be considered more similar to the current behavior.

At 508, a max pooling layer 410 performs max pooling on the attention-applied output. Max pooling layer 410 outputs a short-term prediction, such as a feature vector, after the max pooling operation. If short-term prediction network 310 includes addition convolution layers, the feature vector may then be processed by an additional convolution layer, attention layer, and/or max pooling layer, or other different types of layers. In the end, short-term prediction network 310 outputs a feature vector that represents the historical behaviors given the current behavior.

The following describes an example. The current embedding for the current behavior is $e_i$ and the embeddings of historical behaviors are $e_1, e_2, \ldots, e_j$. The similarity between current behavior and historical behaviors are measured by $<e_i, e_1>, <e_i, e_2>, \ldots, <e_i, e_j>$, where $<x, y>$ stands for a combination, such as the dot product of x and y. The dot products form a vector, denoted as "s", whose length is the number of historical behaviors. Suppose in this example j=4 and s=[0.1, 0.4, 0.2, 0.3]. The higher the value, the more relevant a respective historical behavior is to the current behavior.

Convolution layer 406 applies the 1D convolution to $e_1$, $e_2, \ldots, e_j$, and generates the convolution outputs, which may be a vector of the same length of the number of the instances of historical behaviors. Each element of the vector can be understood as the extracted feature for the corresponding historical behavior. It is possible to extract multiple features for one single historical behavior. In this example, there may be two vectors whose values are [0.1, 0.3, 0.5, 0.2] and [0.3, 0.2, 0.8, 0.6], respectively. The 1D convolution is used to generate the vectors that may be the extracted feature for the corresponding historical behavior. Each vector corresponds to a convolution kernel of size 3. Taking one kernel as an example, the following will illustrate how the vector [0.1, 0.3, 0.5, 0.2] is generated. Suppose j=4 and the embedding of historical behaviors, $e_1, e_2, e_3, e_4$, are [1, 2], [3, 4], [5, 6], [7, 8].

The kernel is a matrix of 2 rows and 3 columns, and the kernel's values are denoted as $[[w_{11}, w_{12}, w_{13}], [w_{21}, w_{22}, w_{23}]]$. Convolution layer 406 applies element-wise multiplication between the kernel and the embedding values, and sums the resulting values. More specifically, the following calculations are performed:

$w_{11}*1+w_{21}*2+w_{12}*3+w_{22}*4+w_{13}*5+w_{23}*6=0.1$ $w_{11}*3+w_{21}*4+w_{12}*5+w_{22}*6+w_{13}*7+w_{23}*8=0.3$ $w_{11}*5+w_{21}*6+w_{12}*7+w_{22}*8+w_{13}*0+w_{23}*0=0.5$. Zeros may be the result of zero paddings.

$w_n*7+w_{21}*8+w_{12}*0+w_{22}*0+w_{13}*0+w_{23}*0=0.2$. Zeros may be the result of zero paddings.

Accordingly, the output of convolution layer is the vector of [0.1, 0.3, 0.5, 0.2]. In the above, a kernel is used to analyze values within the window of the matrix. The kernel is moved one unit through the embedding values after each operation until the end of the embedding sequence is reached.

The output of convolution layer 406 is processed by attention layer 408. If attention layer does not apply the attention, the output of the max pooling layer 410 is [0.5, 0.8], whose features are from the third historical behavior. That is, [0.5] is the maximum value in the first vector in the third position, which corresponds to the third behavior, and [0.8] is the maximum value in the second vector in the third position. However, according to the similarity vector of [0.1, 0.4, 0.2, 0.3], the attention score of [0.2] for the third behavior indicates the third behavior is not the most similar to the current one. Rather, the second historical behavior is the most similar with a score of [0.4].

For each vector, attention layer 408 combines the similarity vector and the feature vectors, such as using an element-wise multiplication between the similarity vector and the feature vector, which is [0.1*0.1, 0.4*0.3, 0.2*0.5, 0.3*0.2] and [0.1*0.3, 0.4*0.2, 0.2*0.8, 0.3*0.6]. The result is two attention-applied vectors, [0.01, 0.12, 0.1, 0.06] and [0.03, 0.08, 0.16, 0.18].

For each attention-applied vector, max pooling layer 410 performs max pooling, which is the maximum of the values. For example, for the first attention applied vector of [0.01, 0.12, 0.1, 0.06], the maximum score is [0.12], and the maximum of the second attention applied vector of [0.03, 0.08, 0.16, 0.18] is the score of [0.18]. The final output is a new feature vector [0.12, 0.18], which will be the input of other layers, such as combination layer 312 in FIG. 3. The new feature vector is a representation of the short-term behavior sequence after the processing of convolution layer 406, attention layer 408, and max pooling layer 410. It is noted that the feature vector may have different numbers of elements, and not just two.

Multigranularity

A behavior may be described at different granularity levels. For example, a behavior may be described by the video being played, a series to which the video belongs, the genre associated with the video, etc. When applying the attention mechanism, if the attention score is measured at a certain level, the attention score may be sub-optimal due to various problems, such as sparsity. That is, there may not be enough information to measure the similarity between the two behaviors at the video level. Also, on the contrary, if similarity is measured at the genre level, the similarity may be sub-optimal due to over-generalization. For example, it may be hard to measure the similarity of two different genres due to over-generalizing the similarity between genres. To alleviate the above issues, short-term prediction network 310 may measure the similarity between two behaviors using multi-granularity levels and combine the results into a unified attention score. Accordingly, short-term prediction network 310 may achieve a good balance between memorization and generalization for the attention mechanism. A memorization may use historical information for similarity and generalization may be used to generalize similarity. Multi-granularity attention-based pooling may compute attention scores from multi-granularities. Then, the attention-based pooling may combine the attention scores. This generates a unified attention score that is applied to the output of convolution layer 406.

For the current behavior, short-term prediction network 310 embeds attributes for the behavior, such as the video identifier (ID), series ID, genres, etc. using the same embedding look-up tables that were used to generate the embeddings for the historical behavior. The embeddings for the multiple granularities are denoted as embeddings $e_{iv}$, $e_{is}$ and $e_{ig}$, where "i" the current behavior and v, s, and g, is video ID, series ID, and genre ID.

For every element in the short-term playback sequence j, attention layer 408 applies the multi-granularity attention to the convolution output. For example, the embedding of each short-term playback behavior is the video id, series id, and genre and is denoted as embeddings $e_{jv}$, $e_{js}$ and $e_{ig}$, respectively. The playback sequence "j" identifies the playback behavior in the short-term playback sequence. Then, attention layer 408 computes the dot product between embedding $e_{jv}$ and embedding $e_{iv}$ as the video level attention score. Finally, attention layer 408 computes the dot product between embedding $e_{js}$ and embedding $e_{is}$ as the series level attention score. Attention layer 408 computes the dot product between embedding $e_{jg}$ and embedding $e_{ig}$ as the genre level attention score. Attention layer 408 unifies the above three attention scores by combining them, such as by summing them. Attention layer 408 multiplies the output of the convolution operation with the unified attention score for the multiple granularities. Max pooling layer 410 applies the max pooling to the convolution outputs multiplied with unified attention scores and generate the final representation of the short term behavior prediction.

Long-Term Prediction Combination

After generating the short-term prediction, the short-term prediction can be combined with the long-term prediction. The long-term prediction may be measured using different methods. For example, there may be many long-term immersive viewing patterns. The patterns may include whether a user account is likely to use an immersive viewing behavior, which content is more likely to be viewing using the immersive viewing behavior, and when user accounts are more likely to exhibit the immersive viewing behavior, such as what time of day. The long-term immersive viewing patterns may be stable during a certain longer term period, such as over one month, months, or a year. These periods may be longer than the short-term behavior time threshold and are long-term immersive viewing behaviors.

Referring back to FIG. 3, long-term prediction network 304 may generate long-term predictions using different methods. For example, all long-term behaviors may be input into a long-term prediction network 304 to determine the long-term prediction. However, there may be a large amount of long-term behaviors to input and analyze, which may be extremely computationally intensive. That is, when the time period is long, the number of behaviors and content that is played during that period may be very large. Instead, some statistics may be generated based on the long-term behaviors and the statistics are input into long-term prediction network 304 instead of the behaviors. The statistics may summarize aspects of the long-term behaviors. Analyzing the statistics may analyze less data and because long-term behaviors may be stable over a longer period of time, the statistics may represent the long-term behaviors in an accurate way.

In some embodiments, the following may be used to generate the long-term prediction, but other methods may be used. For each behavior in a long-term time window, such as the last month, prediction system 114 determines if it qualifies as an immersive viewing behavior. For example, if the immersive viewing behavior is based on three consecutive playbacks of videos with a similar characteristic, the current playback is analyzed with its two succeeding (or preceding) playbacks. In some embodiments, there can be any amount of time limit between the consecutive playbacks when analyzing long-term behavior due to the long-term nature of the prediction.

Prediction system 114 may define statistics that are based on long-term behaviors. For example, an immersive viewing behavior playback ratio for each user account, which may be defined as the ratio between the number of immersive viewing behavior playbacks and the total playbacks within the given long term time window. Also, the immersive viewing behavior playback ratio for each series, which may be defined as the ratio between the number of the immersive viewing behavior playbacks and total playbacks on this series within the given long term time window. Other statistics may be an immersive viewing playback behavior ratio for each video, an immersive viewing behavior playback ratio for each hour of day, an immersive viewing playback behavior ratio for each day of week, an immersive viewing playback behavior ratio for each type of device, and immersive viewing playback behavior ratio for crossing attributes, e.g., immersive viewing playback behavior ratio for each user account on each series, for each user account on each hour of day, and for each user account on each day of week.

Prediction system 114 may use the current contextual data for content and retrieve the related statistics for the behaviors. Then, prediction system 114 inputs the statistics into long-term prediction network 304. Long-term prediction network 304 may then output a long-term behavior modeling. In some examples, the output may be also a feature vector, e.g., [0.2, 0.5, 0.3, 0.4]. In some embodiments, the values [0.2, 0.5] of the feature vector represent the embedding of the immersive viewing behavior ratio for this user account and the values [0.3, 0.4] of the feature vector represent the embedding of the immersive viewing behavior ratio for the current behavior. However, the feature vector is a representation of the long-term behavior sequence after the processing of long-term prediction network 304. It is noted that the feature vector may have different numbers of elements, and not just four.

The distributions of the statistics may be diverse and skewed. To make the training process of the neural network (e.g., a deep neural network) model of long-term prediction network 304 more stable and to achieve better performance, the statistics may be embedded in a space, such as a low-dimensional Euclidean space. In some embodiments, the embedding may, for each statistic, compute its k-quantity training sample where k may be 50 or 100, bucketize the values to a discrete value with its k-quantiles as boundaries, and embed the discrete values into a Euclidean space using an embedding look-up table. The embeddings of all these statistics may be concatenated into a single vector representing the modeling result of long-term behaviors.

As described above, the long-term prediction and the short-term predication are combined using the contextual data. Then, prediction system 114 uses the combined result to predict whether the current playback is part of an immersive viewing behavior.

CONCLUSION

Accordingly, the use of short-term behavior and long-term behavior may improve the operation of supplemental content system 108. For example, the prediction may be more accurate. Also, the operation of a prediction network is improved based on using aspects of the immersive viewing behavior. For example, the size of the kernel that is used is based on the immersive viewing behavior characteristics and the attention-based mechanism may improve the calculation of the short-term prediction. Further, multi-granularity for describing the video in the behaviors is used when generating the attention score.

System

Figure 6:
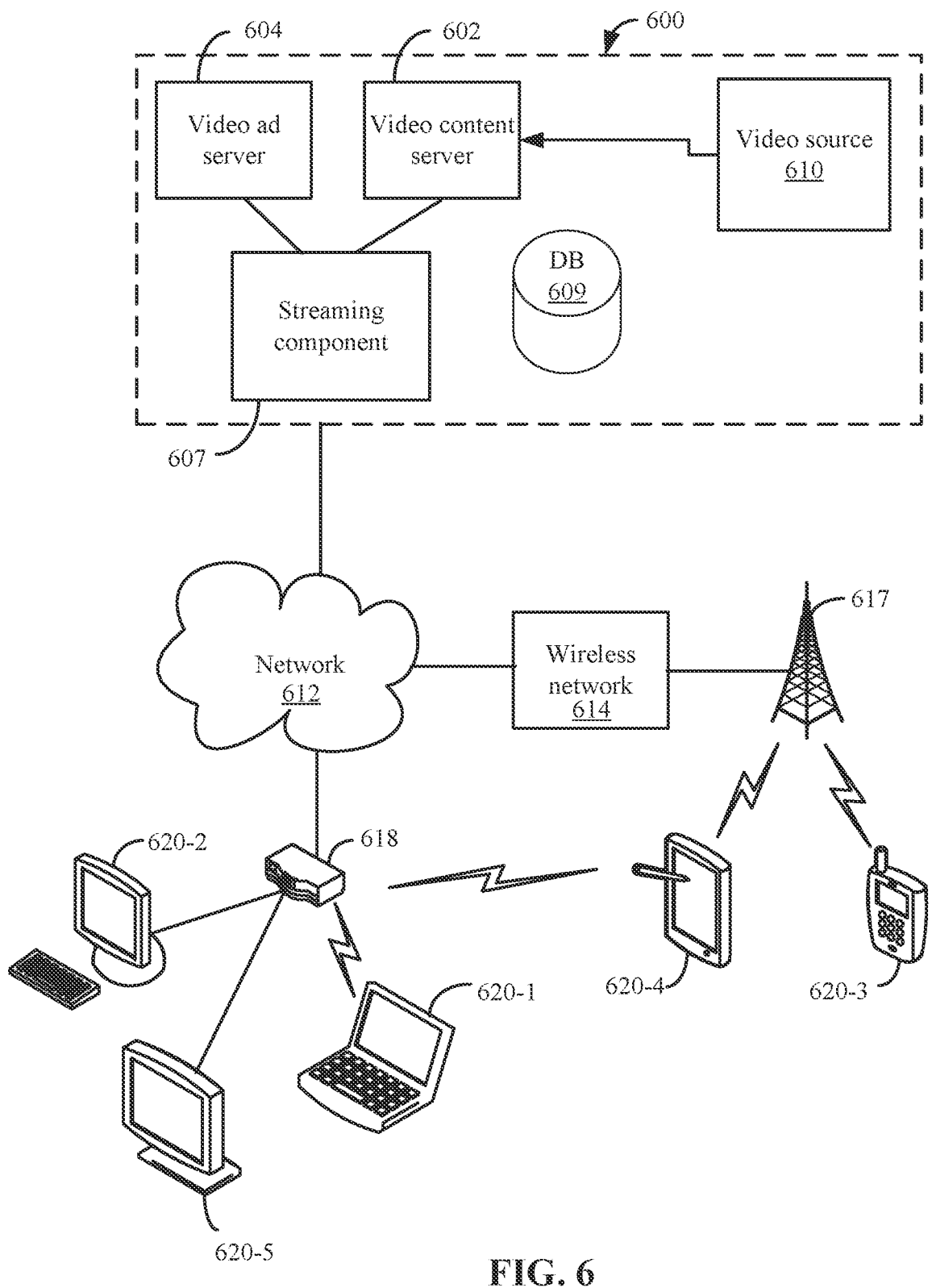
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HyperText Transfer Protocol (HTTP) and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
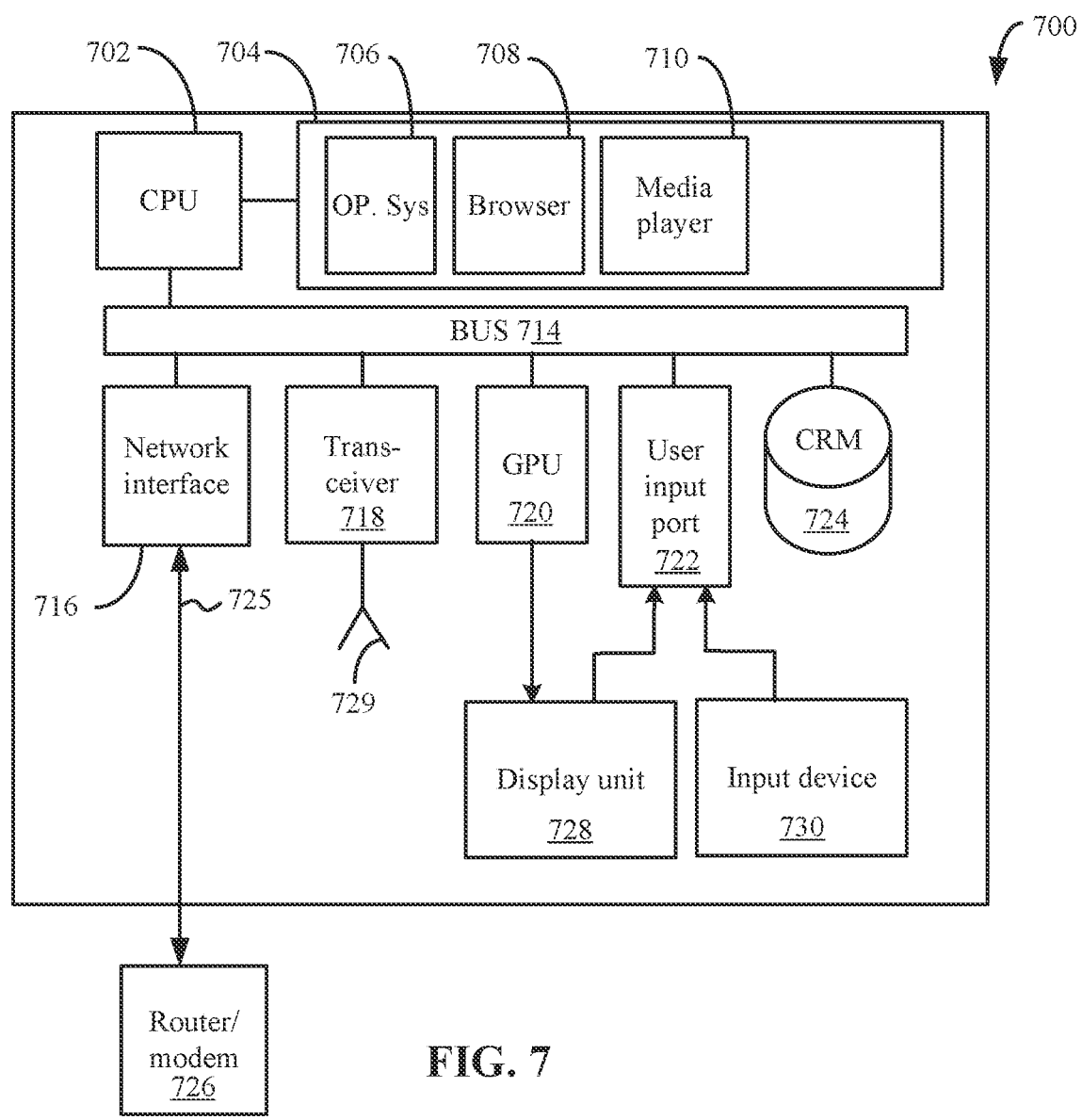
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera, or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

EXAMPLE EMBODIMENTS

In some embodiments, a method comprising: inputting, by a computing device, a sequence of historical behaviors for a plurality of instances of content into a prediction network to generate a sequence of values that model the sequence of historical behaviors, wherein a restriction on an operation performed by the prediction network is based on a characteristic of an viewing behavior; generating, by the computing device, a sequence of attention scores based on a similarity of a current behavior for a first instance of content to respective instances of historical behaviors in the sequence of historical behaviors; adjusting, by the computing device, respective values in the sequence of values based on corresponding attention scores in the sequence of attention scores to generate an adjusted sequence of values; and sampling, by the computing device, the adjusted sequence of values to generate an output from the prediction network that models the sequence of historical behaviors based on the current behavior, the output for determining a prediction if the current behavior is indicative of the viewing behavior.

In some embodiments, the output models the sequence of historical behaviors given a request for content in the current behavior.

In some embodiments, the sequence of historical behaviors is from within a threshold based on a time.

In some embodiments, the output comprises a first output, the method further comprising: generating a second output based on analyzing a set of historical behaviors that includes a behavior not included in the sequence of historical behaviors, wherein the behavior is from a first time period outside of a second time period associated with the sequence of historical behaviors; and combining the first output and the second output to determine whether the current behavior is indicative of the viewing behavior.

In some embodiments, the characteristic of the viewing behavior comprises a number of instances of content that are viewed within a time period; and the restriction is based on the number.

In some embodiments, the restriction is a kernel size of the operation.

In some embodiments, the number of instances of content include a similar characteristic of being an episode in a show.

In some embodiments, the operation comprises a convolution operation that analyzes a portion of the sequence of historical behaviors based on the restriction.

In some embodiments, the restriction is based on a number of instances of content that are viewed within a time period for the viewing behavior.

In some embodiments, the sequence of values is a same length as the sequence of historical behaviors.

In some embodiments, generating the sequence of attention scores comprises: comparing the similarity of the current behavior to each instance of the historical behaviors to generate the sequence of attention scores, wherein each attention score measures the similarity from the current behavior to a respective historical behavior.

In some embodiments, generating the sequence of attention scores comprises: comparing the similarity of a plurality of attributes for the current behavior to the plurality of attributes for each instance of the historical behaviors to generate a plurality of similarity scores; and combining the plurality of similarity scores to generate the sequence of attention scores.

In some embodiments, sampling the adjusted sequence of values comprises performing a pooling operation that downsamples the adjusted sequence of values.

In some embodiments, the viewing behavior is an immersive viewing behavior that is associated with the characteristic.

In some embodiments, the method further comprising: using the prediction to select a delivery format from a plurality of delivery formats of content in a playback session of a video that is associated with the current behavior.

In some embodiments, the method further comprising: using the prediction to select a delivery format from a plurality of delivery formats of supplemental content in a playback session of a video that is associated with the current behavior.

In some embodiments, a non-transitory computer-readable storage medium containing instructions, that when executed, control a computer system to be operable for: inputting a sequence of historical behaviors for a plurality of instances of content into a prediction network to generate a sequence of values that model the sequence of historical behaviors, wherein a restriction on an operation performed by the prediction network is based on a characteristic of an viewing behavior; generating a sequence of attention scores based on a similarity of a current behavior for a first instance of content to respective instances of historical behaviors in the sequence of historical behaviors; adjusting respective values in the sequence of values based on corresponding attention scores in the sequence of attention scores to generate an adjusted sequence of values; and sampling the adjusted sequence of values to generate an output from the prediction network that models the sequence of historical behaviors based on the current behavior, the output for determining a prediction if the current behavior is indicative of the viewing behavior.

In some embodiments, method comprising: generating, by a computing device, a first output using a first prediction network, wherein a first input to the first prediction network is based on a first number of behaviors within a first time threshold, and wherein the first prediction network uses a restriction on an operation performed by the first prediction network based on a characteristic of an viewing behavior; generating, by the computing device, a second output using a second prediction network, wherein a second input to the second prediction network is based on a second number of behaviors within a second time threshold that includes a greater amount of time than the first time threshold; combining, by the computing device, the first output and the second output to generate a prediction that predicts whether a current behavior is indicative of result in the viewing behavior.

In some embodiments, generating the first output comprises: generating a sequence of attention scores based on a similarity of the current behavior for a first instance of content to respective instances of historical behaviors in the sequence of historical behaviors; and adjusting respective values in a sequence of values in the first output based on corresponding attention scores in the sequence of attention scores to generate an adjusted sequence of values.

In some embodiments, the method further comprising: using the prediction to select a delivery format from a plurality of delivery formats of supplemental content in a playback session of a video that is associated with the current behavior.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving, by a computing device, a value for a prediction network that is based on a number of consecutive playbacks of instances of content from a viewing behavior;
inputting, by the computing device, a sequence of historical behaviors for a plurality of instances of content into the prediction network to generate a sequence of values that model the sequence of historical behaviors, wherein a number of adjacent nodes in the prediction network are analyzed in an operation, and wherein the number of adjacent nodes is set based on the value for the number of consecutive playbacks of instances of content from the viewing behavior;
generating, by the computing device, a sequence of attention scores based on a similarity of a current behavior for a first instance of content to respective instances of historical behaviors in the sequence of historical behaviors;
adjusting, by the computing device, respective values in the sequence of values based on corresponding attention scores in the sequence of attention scores to generate an adjusted sequence of values; and
sampling, by the computing device, the adjusted sequence of values to generate an output from the prediction network that models the sequence of historical behaviors based on the current behavior, the output for determining a prediction if the current behavior is indicative of the viewing behavior of the number of consecutive playbacks.

2. The method of claim 1, wherein the output models the sequence of historical behaviors given a request for content in the current behavior.

3. The method of claim 1, wherein the sequence of historical behaviors is from within a threshold based on a time.

4. The method of claim 1, wherein the output comprises a first output, the method further comprising:
generating a second output based on analyzing a set of historical behaviors that includes a behavior not included in the sequence of historical behaviors, wherein the behavior is from a first time period outside of a second time period associated with the sequence of historical behaviors; and
combining the first output and the second output to determine whether the current behavior is indicative of the viewing behavior.

5. The method of claim 1, wherein:
the instances in the number of consecutive playbacks of instances of content are viewed within a time period.

6. The method of claim 1, wherein the operation has a kernel size of the number of consecutive playbacks of instances of content.

7. The method of claim 1, wherein the number of consecutive playbacks of instances of content include a similar characteristic of being an episode in a show.

8. The method of claim 1, wherein the operation comprises a convolution operation that analyzes a portion of the sequence of historical behaviors based on the number of adjacent nodes.

9. The method of claim 1, wherein the number of instances of content is set based on instances of content that have a similar characteristic being viewed consecutively.

10. The method of claim 1, wherein the sequence of values is a same length as the sequence of historical behaviors.

11. The method of claim 1, wherein generating the sequence of attention scores comprises:
comparing the similarity of the current behavior to each instance of the historical behaviors to generate the sequence of attention scores, wherein each attention score measures the similarity from the current behavior to a respective historical behavior.

12. The method of claim 1, wherein generating the sequence of attention scores comprises:
comparing the similarity of a plurality of attributes for the current behavior to the plurality of attributes for each instance of the historical behaviors to generate a plurality of similarity scores; and
combining the plurality of similarity scores to generate the sequence of attention scores.

13. The method of claim 1, wherein sampling the adjusted sequence of values comprises performing a pooling operation that down-samples the adjusted sequence of values.

14. The method of claim 1, wherein the viewing behavior is an immersive viewing behavior that is based on consecutive playbacks of instances of content that have a similar characteristic.

15. The method of claim 1, further comprising:
using the prediction to select a delivery format from a plurality of delivery formats of content in a playback session of a video that is associated with the current behavior.

16. The method of claim 1, further comprising:
using the prediction to select a delivery format from a plurality of delivery formats of supplemental content in a playback session of a video that is associated with the current behavior.

17. The method of claim 1, wherein
generating the sequence of attention scores comprises comparing the similarity of the current behavior for the first instance of content to an instance of historical behavior in the sequence of historical behaviors to generate an attention score, and
adjusting respective values comprises adjusting a corresponding value in the sequence of values based on the attention score, wherein when the attention score indicates a higher similarity to the current behavior compared to another attention score, the value is adjusted with a higher weight than another value that corresponds to the another attention score.

18. A non-transitory computer-readable storage medium containing instructions, that when executed, control a computer system to be operable for:
receiving, by a computing device, a value for a prediction network that is based on a number of consecutive playbacks of instances of content from a viewing behavior;
inputting, by the computing device, a sequence of historical behaviors for a plurality of instances of content into the prediction network to generate a sequence of values that model the sequence of historical behaviors, wherein a number of adjacent nodes in the prediction network are analyzed in an operation, and wherein the number of adjacent nodes is set based on the value for the number of consecutive playbacks of instances of content from the viewing behavior;
generating, by the computing device, a sequence of attention scores based on a similarity of a current behavior for a first instance of content to respective instances of historical behaviors in the sequence of historical behaviors;

adjusting, by the computing device, respective values in the sequence of values based on corresponding attention scores in the sequence of attention scores to generate an adjusted sequence of values; and sampling, by the computing device, the adjusted sequence of values to generate an output from the prediction network that models the sequence of historical behaviors based on the current behavior, the output for determining a prediction if the current behavior is indicative of the viewing behavior of the number of consecutive playbacks.

19. A method comprising:

receiving, by a computing device, a value for the first prediction network that is based on a number of consecutive playbacks of instances of content from a viewing behavior;

generating, by the computing device, a first output using a first prediction network, wherein a first input to the first prediction network is based on a first number of behaviors within a first time threshold, and wherein the first prediction network analyzes a number of adjacent nodes in an operation, and wherein the number of adjacent nodes is set based on the value for the number of consecutive playbacks of instances of content from the viewing behavior;

generating, by the computing device, a second output using a second prediction network, wherein a second input to the second prediction network is based on a second number of behaviors within a second time threshold that includes a greater amount of time than the first time threshold; and combining, by the computing device, the first output and the second output to generate a prediction that predicts whether a current behavior is indicative of result in the viewing behavior of the number of consecutive playbacks.

20. The method of claim 19, wherein generating the first output comprises:

generating a sequence of attention scores based on a similarity of the current behavior for a first instance of content to respective instances of behaviors; and adjusting respective values in a sequence of values in the first output based on corresponding attention scores in the sequence of attention scores to generate an adjusted sequence of values.

21. The method of claim 19, further comprising:

using the prediction to select a delivery format from a plurality of delivery formats of supplemental content in a playback session of a video that is associated with the current behavior.

* * * * *